United States Patent [19]

Woodward et al.

[11] Patent Number: 5,758,170
[45] Date of Patent: May 26, 1998

[54] SYSTEM FOR PREVENTING CORRUPTION DURING CPU RESET

[75] Inventors: James Sheldon Woodward; Daniel Felder, both of Austin; Nam Nguyen, Round Rock, all of Tex.

[73] Assignee: Dell USA, L.P., Round Rock, Tex.

[21] Appl. No.: 407,441

[22] Filed: Mar. 20, 1995

[51] Int. Cl.⁶ .................................................. G06F 9/22
[52] U.S. Cl. ..................... 395/740; 395/735; 395/868; 395/869; 395/836
[58] Field of Search ............................. 395/293, 287, 395/700, 500, 750, 736, 740, 182.21, 182.22, 800, 560; 364/280.2, 975.2, 707

[56] References Cited

U.S. PATENT DOCUMENTS

| | | | |
|---|---|---|---|
| 4,787,032 | 11/1988 | Culley | 395/280 |
| 4,803,682 | 2/1989 | Hara et al. | 395/182.21 |
| 5,109,506 | 4/1992 | Begun | 395/182.21 |
| 5,170,481 | 12/1992 | Begun et al. | 395/733 |
| 5,283,792 | 2/1994 | Davies, Jr. et al. | 395/182.2 |
| 5,381,530 | 1/1995 | Thayer et al. | 395/827 |
| 5,410,706 | 4/1995 | Farrand et al. | 395/700 |
| 5,446,403 | 8/1995 | Witkowski | 327/143 |
| 5,457,660 | 10/1995 | Ito | 365/228 |
| 5,465,360 | 11/1995 | Miller et al. | 395/700 |
| 5,574,943 | 11/1996 | Daftari | 395/821 |

*Primary Examiner*—Jack B. Harvey
*Assistant Examiner*—Raymond N. Phan
*Attorney, Agent, or Firm*—Stephen A. Terrile; Skjerven, Morrill, MacPherson, Franklin, & Friel

[57] ABSTRACT

The present invention discloses a system and method for preventing a computer from initiating new cycles after a user has requested a reboot of the computer. The invention includes a programmable logic device that monitors the reset request (SRESET) signal, and in response places the central processing unit (CPU) of the computer in a hold state. The programmable logic device does this by issuing a hold (HOLD) signal to the CPU and receives back from the CPU a hold acknowledge (HLDA) signal. After the HLDA signal is received, the programmable logic device issues a CPU reset (RESETCPU) signal, which causes the CPU to reset after a certain number of clock cycles have passed. By placing the CPU in a hold state, the programmable logic device prevents the CPU from initiating new cycles just prior to resetting, which could result in corruption of the computer system.

22 Claims, 5 Drawing Sheets

1

SYSTEM FOR PREVENTING CORRUPTION DURING CPU RESET

FIELD OF THE INVENTION

The present invention relates generally to a central processing unit (CPU) of a personal computer system More particularly, the present invention relates to an apparatus and method for maintaining the integrity of the CPU while the CPU is being re-initialized or "rebooted." Still more particularly, the present invention relates to a system for holding the CPU inactive prior to the time that the CPU receives a reset signal to prevent the CPU from starting a cycle just prior to being reset.

BACKGROUND OF THE INVENTION

FIG. 1 is a block diagram of a conventional computer system 10 that comprises a microprocessor or central processing unit ("CPU") 12, a cache/DRAM controller (CDC) 16, and a CPU host (or local) bus 14 coupled to the CPU 12 and CDC 16. A bank of dynamic random access memory (DRAM) chips (shown collectively as 17) is shown coupled to the CDC 16 through a memory bus 15. The DRAM 17 is also coupled to the CPU 12 through the host bus 14. The system of FIG. 1 preferably includes a keyboard controller 20 connected to host bus 14 through a bus bridge 22.

The microprocessor 12 shown in FIG. 1 may comprise a model 80486 microprocessor, and the CPU host bus 14 could comprise an 80486-style host bus. As such, the CPU host bus 14 includes a set of data lines D[31:0], a set of address lines A[31:0], and a set of control lines (not specifically shown). Details regarding the various bus cycles and protocols of the 80486 CPU host bus 14 are not discussed in detail herein, as they are well known by those in the art, and are available in numerous publications.

Two control lines that are relevant to an understanding of the present invention, however, are the address hold (AHOLD) line and the reset CPU (RESETCPU) line, on which signals are transmitted by the CDC 16 to the CPU 12 during system reset. These control lines have been shown separately from the host bus 14 for purposes of illustration. Two additional control lines that are relevant to the following discussion are the address strobe (ADS) line and the ready (RDY) line. The ADS signal is asserted onto the dedicated ADS line in the host bus 14 by either the CPU 12 or other devices that use the host bus 14. This indicates the start of a bus cycle (typically a read or write cycle) to a target on the host bus 14. The RDY signal is generated by the target device to indicate that the bus cycle has been completed by the target device. The ADS and RDY signals are provided on dedicated control lines (not specifically shown) in the host bus 14.

Power for the CPU 5, CDC 16 and memory 7 is provided by one or more power supply circuits, generally denoted as 13 in FIG. 1. CPU 12 and CDC 16 may be contained on separate chips, or may be fabricated on a single integrated processor chip. In accordance with normal convention, the keyboard controller 20, typically an INTEL 8051® microcontroller, connects to a data bus 17. The data bus 17 connects to the host bus 14 through the bus bridge 22. In addition, the keyboard controller 20 connects to the keyboard 25 through a suitable connection 37 for receiving serial data signals therefrom.

One of the signals generated by the keyboard controller 20 is a soft reset request (SRESET) signal in response to a user reboot command (which may be performed by depressing the control alt, and delete keys, simultaneously, or an equivalent action). The SRESET signal shown on a separate line from data bus 17 for purposes of illustration, is transmitted to the CDC 16. As one skilled in the art will understand, the SRESET line may be transmitted to the CDC 16 either directly or via the data bus 17, through the bus bridge 22.

Frequently, a user of a personal computer system, such as that shown in FIG. 1, may need to reboot the system Rebooting may be necessary, for example, if the system has locked-up, if the system is operating improperly, or if new software has been loaded into the system. Rebooting can occur in various ways. One common method available to reboot a computer system is to simultaneously depress the control, alt, and delete keys on the computer keyboard 25. In response, the keyboard controller 20 generates the soft reset (SRESET) signal that is received by the CDC 16. The SRESET signal typically is an active low signal After receiving the SRESET signal the CDC 16 sends an address hold (AHOLD) signal to the CPU 12, and shortly thereafter, drives a reset CPU (RESETCPU) signal to the CPU to reset the CPU.

In accordance with the protocol of the INTEL 80486 processor, the CPU 12 does not acknowledge the RESETCPU signal until the completion of three clock cycles. In addition, the AHOLD signal does not prevent the CPU from performing bus cycles. This delay in acknowledging the RESETCPU signal means that the CPU can potentially begin another bus cycle after receiving the RESETCPU signal. If the CPU 12 does begin another cycle, other components (such as, for example, the CDC 16 and memory 7) in the computer system 10 may begin operations to complete the cycle. While this is transpiring, the CPU responds to the RESETCPU, without terminating the activity of the other components performing the existing bus cycle. The activity of these other system components could potentially cause corruption of internal state machines. The net effect is that the computer system may continue to transfer data from a pre-existing cycle after the CPU has been reset. After the CPU comes out of reset and tries to initiate a new cycle, the various components or subsystems of the computer system may be corrupted, causing the system to lock-up.

A timing diagram illustrating the problem is depicted in FIG. 2. As shown in FIG. 2, SRESET is asserted low at time $t_1$. Shortly thereafter, the CDC asserts the AHOLD signal and then at time $t_2$ drives the RESETCPU signal Both the AHOLD and RESETCPU signal are toggled for a predetermined period. As shown in FIG. 2, an ADS signal an address signal a data signal and a RDY signal all are driven on the host bus 14 after the CPU has received the RESETCPU signal at $t_2$, possibly causing system corruption.

This problem with rebooting the CPU appears with a fair degree of frequency in computer systems configured similarly to the system of FIG. 1. It obviously would be advantageous to eliminate this problem and to prevent system corruption during rebooting. It also would be advantageous to implement a solution which did not require additional pins to be added to the CPU or CDC.

SUMMARY OF THE INVENTION

Accordingly, there is provided herein a system for placing the CPU in a hold state prior to transmitting a reset signal to the CPU, thereby preventing the CPU from initiating new cycles prior to or at the beginning of a reset period.

The invention constructed in accordance with the preferred embodiment includes a programmable logic device which intercepts a reset request (SRESET) signal from a keyboard controller or other device. The programmable logic also receives a reset memory controller (CDCRST) signal from the memory controller (or CDC), which indicates whether the CDC is in a reset cycle. The programmable logic device issues a hold (HOLD) signal to the CPU after receiving the reset request SRESET signal After the CPU acknowledges the hold request by issuing a HLDA signal the programmable logic device asserts a CPU reset (RESETCPU) signal. The RESETCPU signal is maintained until the CPU initiates a reset procedure. In the preferred embodiment, the HOLD signal is maintained until SRESET is deasserted. The RESETCPU signal is maintained until the CDC completes its reset cycle. The RESETCPU signal is deasserted a clock cycle after the CDCRST signal is deasserted.

The computer system of the present invention may include a host bus to which the CPU and programmable logic device connect for transmission of signals. In such a system, dedicated control lines preferably are provided for the HOLD and HLDA signals. A similar control line also is provided for the RESETCPU signal Once the CPU issues the HLDA signal in response to the HOLD signal, the CPU will not initiate new cycles until it leaves the hold state. Consequently, the CPU can be reset without the potential corruption which might otherwise result.

These and other characteristics and advantages of the present invention will become readily apparent to those skilled in the art upon reading the following detailed description and claims and by referring to the accompanying drawings.

BRIEF DESCRIPTION OF THE DRAWINGS

For a more detailed description of the preferred embodiment of the invention, reference will now be made to the accompanying drawings, wherein.

DESCRIPTION OF THE PREFERRED EMBODIMENT

In the following description, specific details are set forth, such as specific devices, part numbers, process steps, addresses, sequences, and the like, in order to provide a thorough understanding of the present invention. It will be apparent, however, to one skilled in the art that these specific details need not be employed to practice the present invention. For example, in the preferred embodiment the present method is implemented with an INTEL 80486® microprocessor. The method of the present invention, however, is equally applicable to any microprocessor design in which the central processing unit (CPU) is capable of starting bus cycles after the receipt of a reset signal. In other instances, well-known processing steps and device configurations are not described in detail in order not to obscure the present invention with a recitation of well known information.

Figure 3:
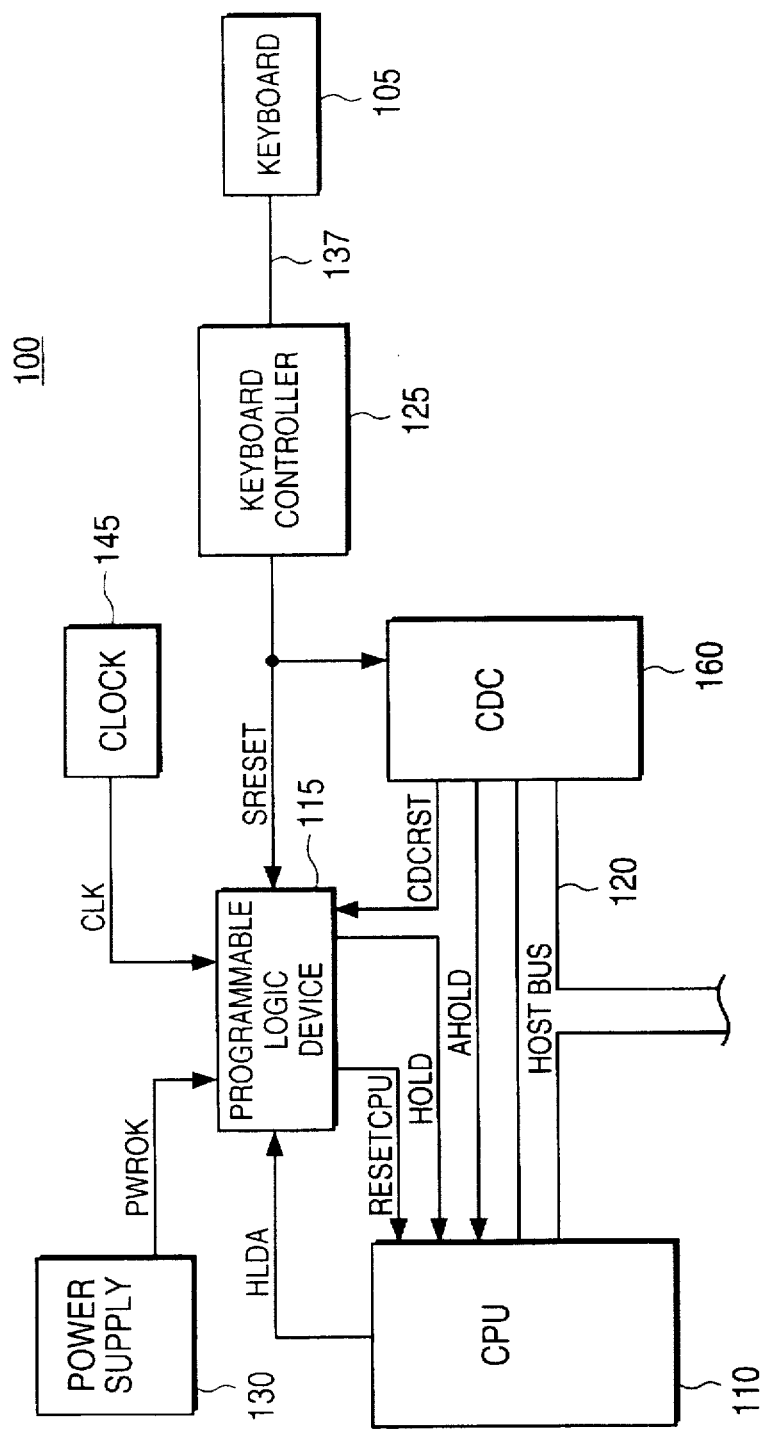
FIG. 3 is a block diagram of a CPU reset system constructed in accordance with the preferred embodiment.

Referring now to FIG. 3, the computer system 100 constructed in accordance with the preferred embodiment includes a microprocessor or CPU 110, a programmable logic device 115, and a keyboard controller 125. The preferred system also includes a memory controller (or CDC) 160, power supply 130 and a system clock 145. In accordance with the preferred embodiment, the CPU 110 comprises one of the INTEL 8086® family of processors, such as, for example, the INTEL 80486®. One skilled in the art will understand, however, that the present invention can be used with any microprocessor which does not suspend operation or reset immediately upon receiving a reset signal.

Figure 1:
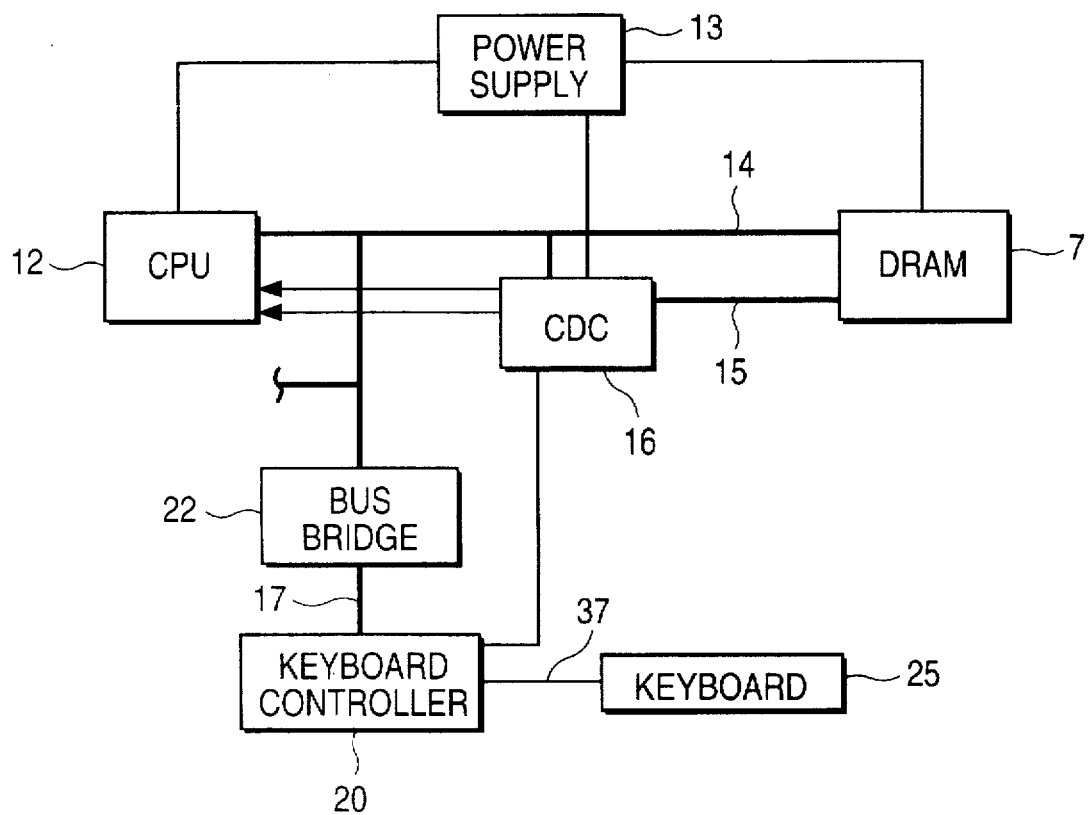
FIG. 1 is a block diagram of a prior art computer system.
Figure 2:
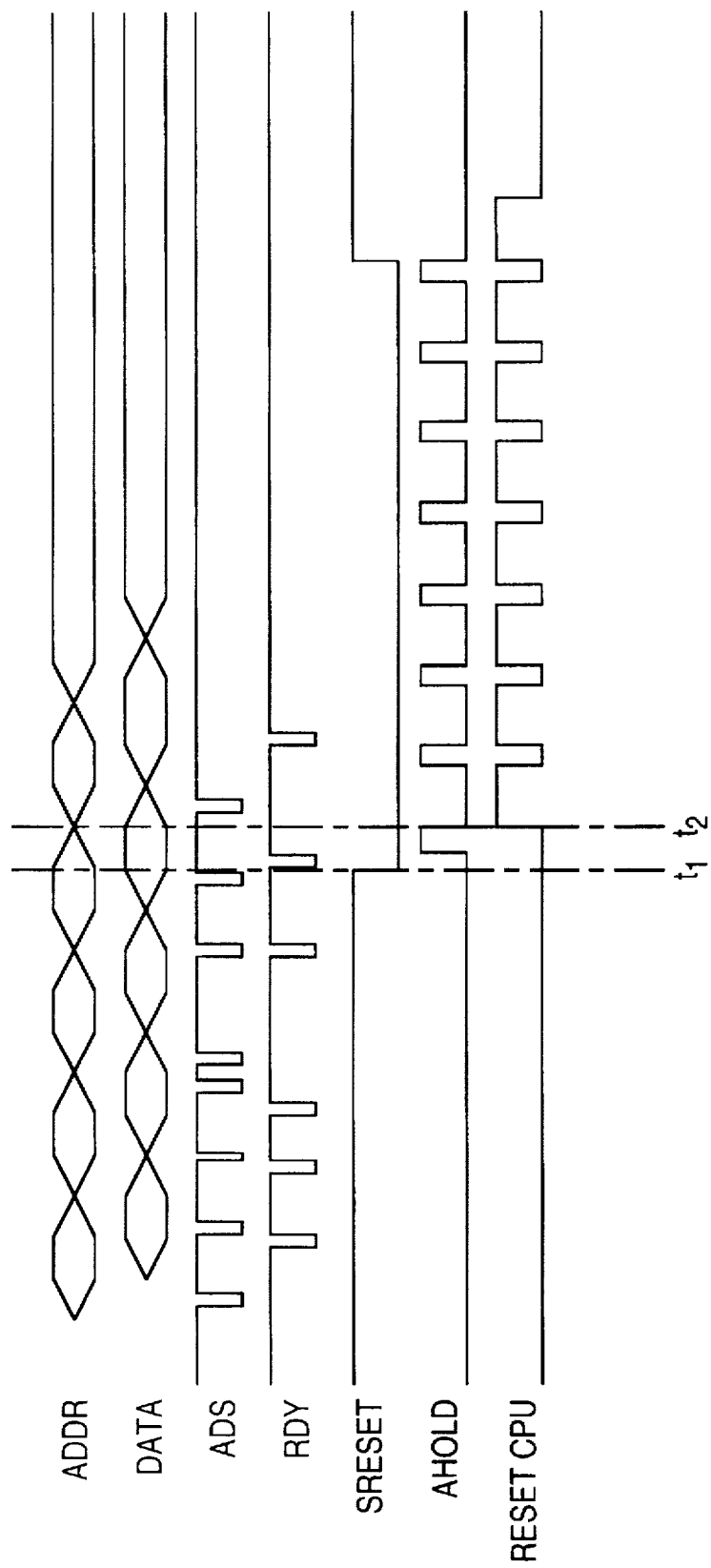
FIG. 2 is a timing diagram of a reset procedure to the CPU of FIG. 1.

According to normal convention, the CPU 110 connects to the CDC 160 and to other peripheral devices (not shown specifically) via a host bus 120. The host bus 120 may comprise an 80486 style local bus comprised of address lines, data lines and control lines. In the exemplary illustration of FIG. 3, the programmable logic device 115 is shown directly connected to the CPU 110. As one skilled in the art will understand these, and the other direct connections shown in FIG. 3, may comprise control lines in the host bus 120 or in some other peripheral bus system Referring still to FIG. 3, the memory controller or CDC 160, as in the prior art design of FIG. 1, receives a soft reset (SRESET) signal from the keyboard controller 125. In response, the CDC 160 may transmit an address hold (AHOLD) signal to the CPU 110 on a dedicated control line in the host bus 120. In the present invention, however, the AHOLD signal is not relevant (or is a "don't care") during reset. Unlike FIG. 1, the CDC 160 in the preferred embodiment is not connected to the reset CPU (RESETCPU) line. The CDC 160 does, however, preferably provide a reset CDC (CDCRST) signal, on a dedicated control line, to the programmable logic device 115. The CDCRST signal is toggled by the CDC during reset, in accordance with normal practice.

The keyboard controller 125 preferably comprises an INTEL 8051® microcontroller that connects to the host bus 120 through a bus bridge (not shown). In addition, the keyboard controller 125 connects to the keyboard 105 through a suitable connection 137 for receiving serial data signals therefrom The keyboard controller 125, as in the prior art design of FIG. 1, generates a soft reset (SRESET) signal in response to a user command to reboot the system. This command typically is performed by simultaneously depressing the control, alt, and delete keys on a keyboard 105. As one skilled in the art will understand, however, other techniques may be provided for generating the soft reset (SRESET) signal. For example, a user may have the capability of issuing an input/output (I/O) write to a particular register or port, causing the SRESET signal to be issued. Regardless of how generated, the SRESET signal preferably is provided as an input signal to the programmable logic device 115 and to the memory controller (or CDC) 160.

The clock 145, in accordance with normal convention, provides one or more clock signals to various system components to synchronize system activity. In the present invention, the programmable logic device 115 also receives a clock input signal. Similarly, the power supply 130 provides operating power to the system components. In addition to providing operating power, the power supply provides a PWROK signal to indicate to system components that the voltage amplitude of the power supply is stable, and thus system operations can begin. The PWROK is provided as an input to the programmable logic device 115.

The programmable logic device 115 preferably is constructed from existing hardware in the system 100. In the preferred embodiment, the programmable logic device 115 is constructed from logic available to support the CDC 160. As one skilled in the art will understand, however, the programmable logic device could use available logic elsewhere in the system, or additional logic may be added to implement the logic instructions of the present invention.

The programmable logic device 115 preferably receives as an input signal the soft reset (SRESET) signal from the keyboard controller 125, or from some other device or state machine capable of generating the SRESET request. The programmable logic device 115 also receives as input signals the clock signal (CLK) from clock 145, the PWROK signal from the power supply 130, and the CDCRST signal generated by the CDC 160 during its reset cycle.

The programmable logic device 115 provides the RESETCPU signal to CPU 110 on a dedicated control line, and also issues a hold (HOLD) signal to the CPU 110 on a dedicated control line before initiating a reset sequence. The programmable logic 115 receives a hold acknowledge (HLDA) signal back from the CPU 110 on a dedicated control line. As one skilled in the art will understand, most 80486 compatible microprocessors have an input line dedicated to receiving HOLD requests. In accordance with normal convention, a HOLD signal is transmitted via a dedicated control line on the host bus to the CPU by another component on the host bus when that component seeks control or "mastership" of the host bus. The CPU acknowledges the request and issues mastership by returning a hold acknowledge (HLDA) signal to the requesting device via the host bus. According to conventional protocol the CPU 110 will not initiate any new cycles until the HOLD and HLDA signals are deasserted. This protocol is used in the present invention to prevent cycles from being initiated after a RESETCPU signal is received by the CPU 110.

Figure 4:
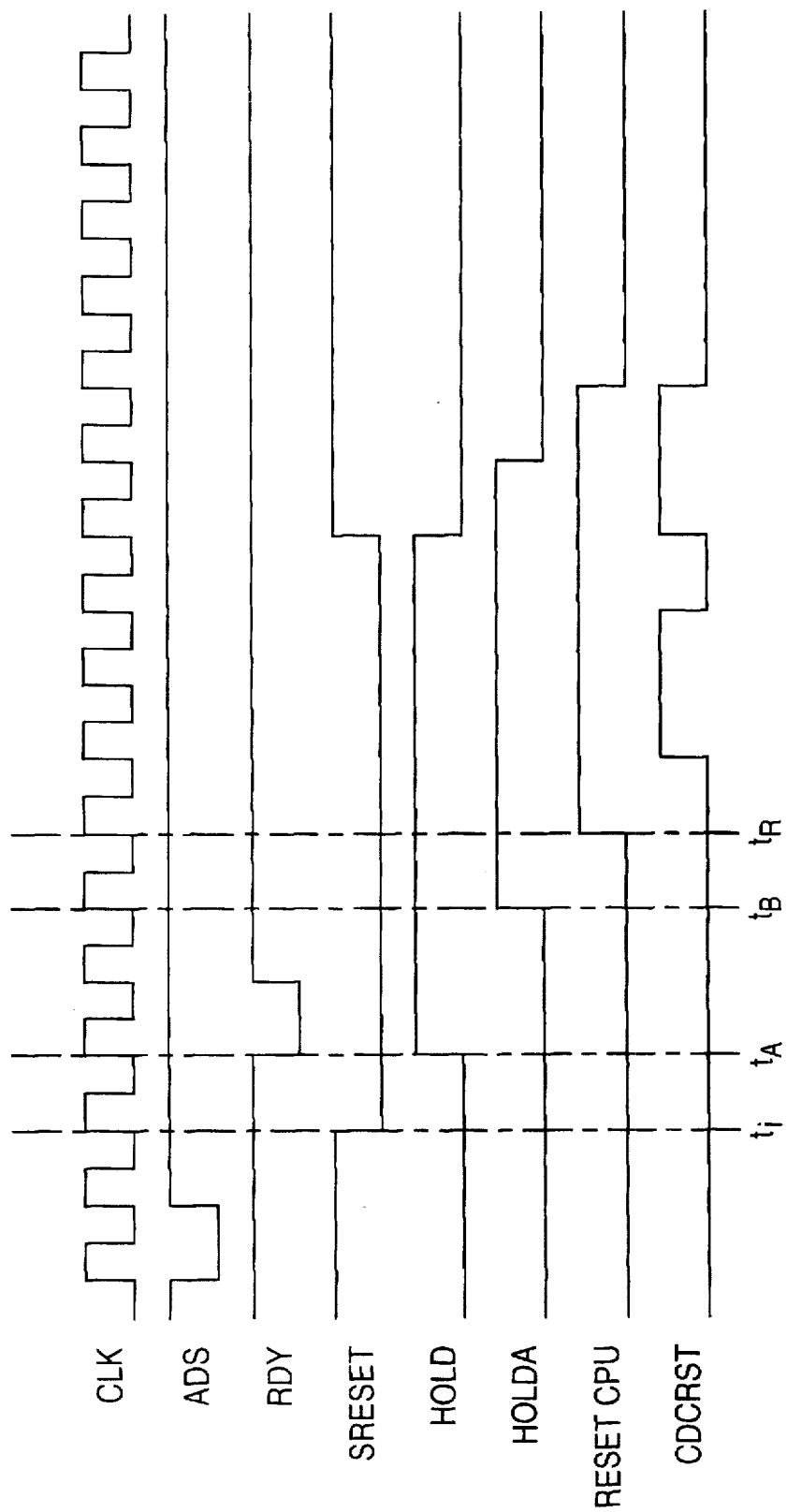
FIG. 4 is a timing diagram of a reset procedure in the preferred system of FIG. 3.
Figure 5:
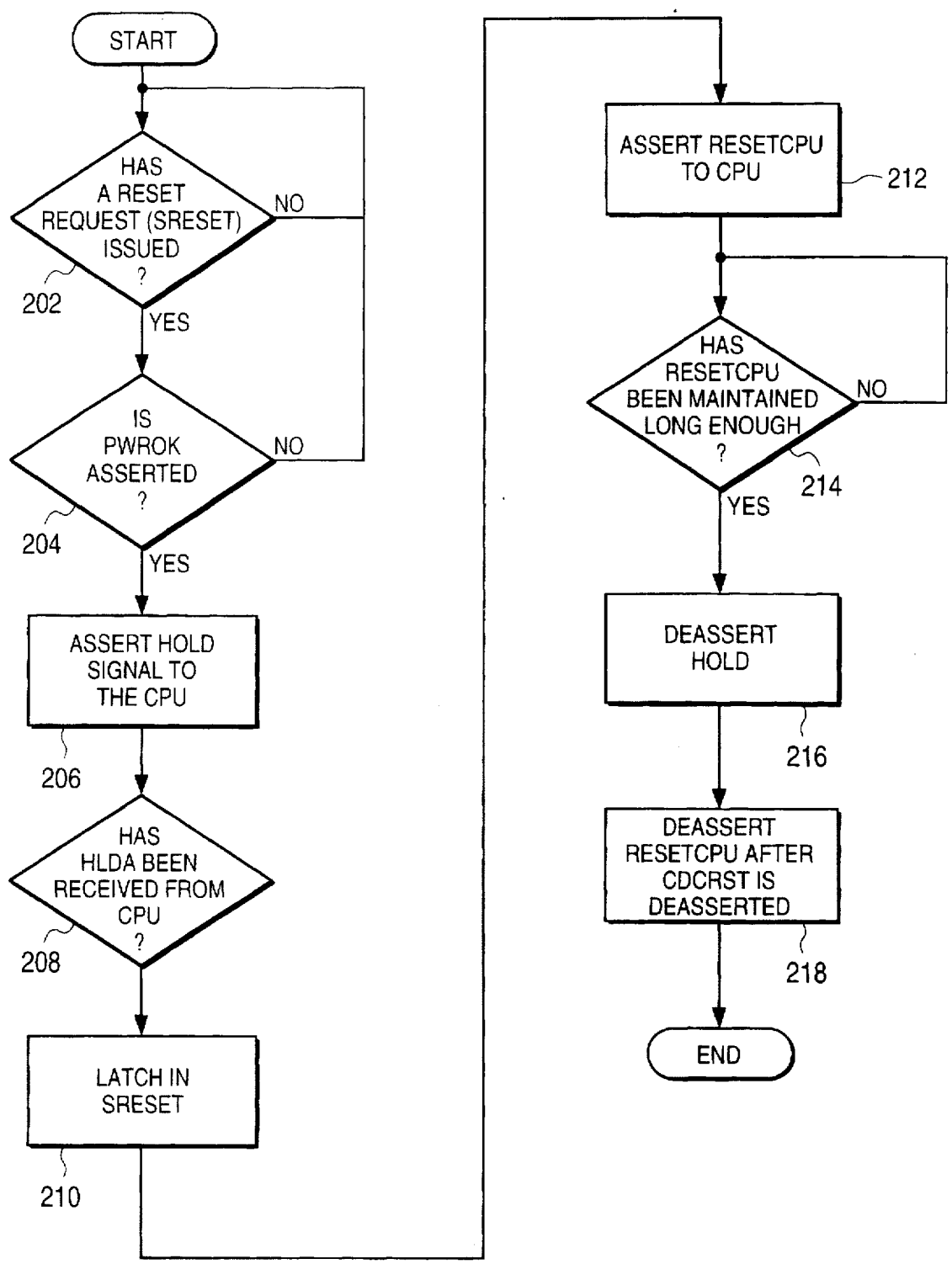
FIG. 5 is a flow chart illustrating the operation of the programmable logic device of FIG. 3.

Referring now to FIGS. 3, 4 and 5, the operation of the programmable logic 115 will now be described in accordance with the preferred embodiment. FIG. 4 is an exemplary timing diagram for the system of FIG. 3, while FIG. 5 illustrates the operation of the programmable logic 115. As shown in the example of FIG. 4, the SRESET, HOLD, HLDA, CDCRST and RESETCPU signals may be asserted on the rising edge of the clock (CLK) signal. Alternatively, any or all of these signals can be asserted on a falling clock edge if desired by the designer, without departing from the principle of the present invention. Moreover, the period between assertion of various signals, and the length of time that the signals are asserted may vary depending upon system requirements and protocols. Thus, FIG. 4 should be viewed only as an illustrative drawing, and not as a limitation on the timing of the various signals present in system 100. Other signals in system 100, such as the address signals, data signals, and other control signals have been omitted for the sake of simplicity and to facilitate an understanding of the present invention.

As shown in step 202, programmable logic 115 monitors the status of the SRESET line to determine whether the SRESET signal has been asserted by the keyboard controller 125 or some other device or state machine in the system 100. If SRESET is detected in step 202 (shown at time ti in FIG. 4), the programmable logic 115 in step 204 checks the PWROK input signal from the power supply 130 to assure that the programmable logic does not begin operation until the voltage from the power supply has stabilized. If PWROK is asserted, then programmable logic 115 asserts the HOLD signal to the CPU 110 at time $t_A$, as indicated in step 206. In FIG. 4, HOLD is issued on the next rising edge of the clock (CLK) signal. As one skilled in the art will understand, HOLD could be asserted on the subsequent falling clock (CLK) edge, or sooner if appropriate logic is used to generate the HOLD signal.

After asserting the HOLD signal in step 206, the programmable logic 115 waits in step 208 for receipt of the hold acknowledge (HLDA) signal back from the CPU 110. After the HLDA signal is received by programmable logic 115 at time $t_B$, the CPU 110 is issued reset on the next rising edge of the clock. In FIG. 4, time $t_B$ is shown as two full clock signals after the assertion of HOLD. This period between $t_A$ and $t_B$ may be shorter or longer, depending upon the requirements and protocol of the CPU 110.

In step 212, the programmable logic 115 asserts the reset CPU (RESETCPU) signal to the CPU 110 at time $t_R$. The RESETCPU signal can be asserted on either a rising clock edge (as shown in FIG. 4), or on a falling clock edge, as desired. Moreover, the timing between $t_A$, $t_B$ and $t_R$ may be varied as desired to assure that HOLD, HLDA and RESETCPU meet minimum timing periods for system integrity. The CDCRST signal is toggled by the CDC 160 after the SRESET signal is received by the CDC 160.

As shown in step 214, RESETCPU is asserted by programmable logic 115 for a predetermined minimum period to be sure that CPU 110 receives the signal and initiates reset. In at least one version of the INTEL 80486® microprocessor, RESETCPU must be maintained for three clock cycles. Thus, programmable logic 115 must be configured with minimum timing parameters as established by the CPU manufacturer.

After the programmed timing periods for RESETCPU have been met, the programmable logic 115 deasserts HOLD in step 216, preferably at the same time that the reset request SRESET is deasserted. The RESETCPU signal, however, remains asserted until the CDC 160 completes its reset cycle, as indicated by the status of the CDCRST signal. After the CDCRST signal is deasserted, the programmable logic 115 deasserts RESETCPU (step 218). In the preferred embodiment, the RESETCPU signal is deasserted on the next rising clock edge after the deassertion of the CDCRST signal.

In the foregoing specification, the invention has been described with reference to the presently preferred embodiment thereof. It will however, be evident that various modifications and changes may be made thereto without departing from the broader spirit and scope of the invention as set forth in the appended claims. The specifications and drawings are, accordingly, to be regarded in an illustrative rather than a restrictive sense.

We claim:

1. A computer system, comprising:

a CPU;

a peripheral device which generates a signal requesting the CPU to reset;

a programmable logic device connected to said CPU and to said peripheral device, said programmable logic device receiving the signal requesting reset, and in response issuing a hold signal to the CPU to place the CPU in a hold state until reset of the CPU has occurred;

a memory controller connected to said programmable logic device and to said peripheral device, the memory controller receiving the signal requesting reset and being reset in response to receiving the signal requesting reset, the memory controller transmitting to said programmable logic device a reset memory controller signal indicating that the memory controller is being reset;

wherein said programmable logic device issues a reset CPU signal to the CPU in response to receiving a hold acknowledge signal from the CPU;

wherein the reset CPU signal is maintained a clock cycle later than the reset memory controller signal.

2. A system for preventing a computer from initiating new cycles after a user has requested a reset of the computer, comprising:

a CPU connected to a CPU host bus, said CPU including a first dedicated input line connected to said host bus for receiving a reset CPU signal, a second dedicated input line connected to said host bus for receiving a hold request signal, and a dedicated output line connected to said host bus for transmitting a hold acknowledge signal, a programmable logic device connected to said CPU host bus, said programmable logic device including a first dedicated output line connected to said host bus for issuing the reset CPU signal, a second dedicated output line connected to said host bus for transmitting the hold request signal to the CPU, and a first dedicated input line connected to said host bus for receiving the hold acknowledge signal from the CPU, said programmable logic device also including a second dedicated input line for receiving a request reset signal;

a memory controller including an input for receiving the request reset signal, the memory controller being reset in response to the request reset signal, the memory controller being connected to the programmable logic device, the memory controller providing a reset memory controller signal to the programmable logic device indicating that the memory controller is being reset;

wherein said programmable logic device issues said hold signal in response to receiving the request reset signal, and said programmable logic device issues said reset CPU signal in response to receiving the hold acknowledge signal;

wherein the reset CPU signal is maintained a clock cycle later than the reset memory controller signal.

3. A system as in claim 2, wherein the CPU issues the hold acknowledge signal after receiving the hold request signal.

4. A system as in claim 2, wherein the request reset signal is generated by a keyboard controller in response to depression of one or more keys on a computer keyboard connected to the keyboard controller.

5. A system as in claim 2, wherein the request reset signal is generated by a keyboard controller in response to an input reboot signal.

6. A system as in claim 3, wherein the CPU remains idle after issuing the hold acknowledge signal.

7. A system for preventing a computer from initiating new cycles after a user has requested a reset of the computer, comprising:

a CPU connected to a CPU host bus, said CPU including a first dedicated input line connected to said host bus for receiving a reset CPU signal, a second dedicated input line connected to said host bus for receiving a hold request signal, and a dedicated output line connected to said host bus for transmitting a hold acknowledge signal;

a programmable logic device connected to said CPU host bus, said programmble logic device including a first dedicated output line connected to said host bus for issuing the reset CPU signal, a second dedicated output line connected to said host bus for transmitting the hold request signal to the CPU, and a first dedicated input line connected to said host bus for receiving the hold acknowledge signal from the CPU, said programmable logic device also including a second dedicated input line for receiving a request reset signal; and a memory controller including an input for receiving the request reset signal, the memory controller being reset in response to the request signal, the memory controller being connected to the programmable logic device, the memory controller providing a reset memory controller signal to the programmable logic device indicating that the memory controller is being reset;

wherein said programmable logic device issues said hold signal in response to receiving the request reset signal and said programmable logic device issues said reset CPU signal in response to receiving the hold acknowledge signal;

wherein the programmble logic device maintains the reset CPU signal on the first dedicated output line until the CPU begins resetting;

wherein the programmable logic device maintains the reset CPU signal on the first dedicated output line after the request reset signal on the second dedicated input line of the programmable logic device is deasserted.

8. A system as in claim 7, wherein the CPU issues the hold acknowledge signal after receiving the hold request signal.

9. A system as in claim 7, wherein the request reset signal is generated by a keyboard controller in response to depression of one or more keys on a computer keyboard connected to the keyboard controller.

10. A system as in claim 7, wherein the request reset signal is generated by a keyboard controller in response to an input reboot signal.

11. A system as in claim 8, wherein the CPU remains idle after issuing the hold acknowledge signal.

12. A system for preventing a computer from initiating new cycles after a user has requested a reset of the computer, comprising:

a CPU connected to a CPU host bus, said CPU including a first dedicated input line connected to said host bus for receiving a reset CPU signal, a second dedicated input line connected to said host bus receiving a hold request signal, and a dedicated output line connected to said host bus for transmitting a hold acknowledge signal;

a programmable logic device connected to said CPU host bus, said programmable logic device including a first dedicated output line connected to said host bus for issuing the reset CPU signal, a second dedicated output line connected to said host bus for transmitting the hold request signal to the CPU, and a first dedicated input line connectd to said host bus for receivng the hold acknowledge signal from the CPU, said programmable logic device also including a second dedicated input line for receiving a request reset signal; and a memory controller including an input for receiving the request reset signal, the memory controller being reset in response to the request reset signal, the memory controller being connected to the programmable logic device, the memory controller providing a reset memory controller signal to the programmable logic device indicating that the memory controller is being reset;

wherein said programmable logic device issues said hold signal in response to receiving the request reset signal, and said programmable logic device issues said reset CPU signal in response to receiving the hold acknowledge signal;

wherein the hold signal is asserted by said programmable logic device until the CPU begins resetting;

wherein the programmable logic device maintains the reset CPU signal on the first dedicated output line for a predetermined minimum period of time.

13. A system as in claim 12, wherein the reset CPU signal is not asserted by the programmable logic device until a certain minimum period of time after issuance of the hold signal.

14. A system as in claim 12, wherein the reset CPU signal is not asserted by the programmable logic until a certain minimum period of time after issuance of the hold acknowledge signal.

15. A system as in claim 12, wherein the CPU issues the hold acknowledge signal after receiving the hold request signal.

16. A system as in claim 12, wherein the request reset signal is generated by a keyboard controller in response to depression of one or more keys on a computer keyboard connected to the keyboard controller.

17. A system as in claim 12, wherein the request reset signal is generated by a keyboard controller in response to an input reboot signal.

18. A system as in claim 15, wherein the CPU remains idle after issuing the hold acknowledge signal.

19. A method for rebooting a computer system, with a central processing unit, comprising the steps of:

issuing a reset request signal in response to a user command to reboot;

placing the central processing unit in a hold state;

asserting a reset CPU signal;

resetting a memory controller in response to the reset request signal;

issuing a reset memory controller signal in response to resetting the memory controller;

wherein the central processing unit is placed in the hold state by:

issuing a hold request to the central processing unit; and receiving a hold acknowledge signal from the central processing unit;

wherein the reset CPU signal is deasserted one clock cycle after termination of the reset memory controller signal.

20. A method as in claim 19, wherein the central processing unit is maintained in the hold state until the central processing unit begins resetting.

21. A method as in claim 19, further comprising the step of latching in the reset request after the hold acknowledge signal is received from the CPU.

22. A method as in claim 19 further comprising:

issuing a voltage stability signal indicating that a voltage level of a power supply in the computer system is stable;

wherein the hold request only is issued if the voltage stability signal has been issued.

* * * * *